United States Patent [19]
Kallevig et al.

[11] Patent Number: 5,638,668
[45] Date of Patent: Jun. 17, 1997

[54] LAWN MOWER HAVING NESTED DECK AND LINER

[75] Inventors: Jeffrey B. Kallevig, Eden Prairie; Jay J. Kakuk, Plymouth, both of Minn.

[73] Assignee: The Toro Company, Minneapolis, Minn.

[21] Appl. No.: 495,069

[22] Filed: Jun. 26, 1995

[51] Int. Cl.$^6$ .................. A01D 34/74; A01D 34/82
[52] U.S. Cl. .......................... 56/320.1; 56/17.2
[58] Field of Search .................. 56/320.1, 320.2, 56/16.7, 17.1, 17.2, 17.5

[56] References Cited

U.S. PATENT DOCUMENTS

| | | |
|---|---|---|
| 3,299,622 | 1/1967 | Hanson et al. |
| 3,320,731 | 5/1967 | Cody et al. |
| 3,890,772 | 6/1975 | Seifert et al. ............... 56/202 |
| 4,189,903 | 2/1980 | Jackson et al. ............... 56/255 |
| 4,205,510 | 6/1980 | Raniero ............... 56/320.1 X |
| 4,711,077 | 12/1987 | Kutsukake et al. ............... 56/320.2 |
| 4,887,420 | 12/1989 | Cerny, Jr. et al. ............... 56/320.2 |
| 4,899,526 | 2/1990 | Harris ............... 56/320.2 |
| 5,129,217 | 7/1992 | Loehr ............... 56/320.2 X |
| 5,157,908 | 10/1992 | Sebben et al. ............... 56/320.1 |

FOREIGN PATENT DOCUMENTS 2028085  3/1980  United Kingdom ............... 56/320.2

*Primary Examiner*—Terry Lee Melius
*Attorney, Agent, or Firm*—James W. Miller

[57] ABSTRACT

A lawn mower has a cutting chamber formed in a metallic liner having front and rear aprons. A plastic deck, molded in one-piece, is screwed to the liner to enclose and hide the liner. The deck/liner combination is inexpensive but strong and durable, the metallic liner being able to resist being chipped or damaged by rocks or other debris being circulated within the cutting chamber provided by the liner. Front and rear axles may be conveniently retained by being trapped or captured between the deck and the front and rear aprons of the liner when the deck and the liner are secured together. A trailing rear shield may be hung from the rear apron of the liner and retained in place by some of the attachment screws used to affix the deck and liner together.

19 Claims, 5 Drawing Sheets

LAWN MOWER HAVING NESTED DECK AND LINER

TECHNICAL FIELD

This invention relates to a rotary lawn mower having a mower housing which is made from a plastic deck that is fixedly attached to a metallic liner that forms the cutting chamber, the deck and liner being nested together.

BACKGROUND OF THE INVENTION

Lawn mowers are well known having a housing supported for movement over the ground by a plurality of wheels. A handle assembly extends upwardly and rearwardly from the housing to allow the operator to push and manipulate the housing. The housing includes a cutting chamber which encloses a cutting blade that rotates in a generally horizontal cutting plane. A lawn mower of the type just described is often known as a walk behind rotary lawn mower.

Many such rotary lawn mowers have housings that are integrally cast out of a metallic material, e.g. from steel or aluminum. Such housings are durable and strong, but relatively heavy and/or expensive to manufacture.

Other lawn mowers are known utilizing decks formed or molded from plastic. While such decks are lighter and may be less expensive depending upon the grade of plastic used, they often lack strength and durability. For example, rocks and other debris are sometimes picked up by the cutting blade and circulated within the cutting chamber. Decks molded from a plastic material are prone to being chipped or damaged by such rocks or similar debris.

Some rotary lawn mowers have a housing which may incorporate more than one material. For example, U.S. Pat. No. 4,189,903 to Jackson discloses a mower having a normal metallic deck. However, a mulching liner can be added to the deck to convert the mower to a mulching mower, the liner being molded from plastic. Thus, when the liner is in place, the mower comprises a metallic deck with a nested plastic liner.

The liner in the Jackson patent is for the purpose of converting the mower to a mulching mower as the liner includes various formed vanes or ribs for coacting with and deflecting the grass circulating within the liner. However, since the liner is made of plastic, it still exhibits various durability problems. Again, rocks or other debris might chip or damage the liner. Moreover, the liner does not add or contribute to the strength of the mower housing. That is provided by the fully formed metallic deck which is sufficiently strong by itself to form the mower housing if mulching is not desired. Thus, the basic strength of the housing is provided entirely by the metallic deck and not by the deck/liner combination, requiring the deck to be manufactured to the same strength standards as any normal mower metallic deck.

SUMMARY OF THE INVENTION

It is one aspect of this invention to provide a lawn mower with a nested deck and liner construction that is both inexpensive to produce but strong and durable.

These and other aspects of the invention are provided A rotary lawn mower which comprises a housing supported for movement over the ground by a plurality of wheels. The housing comprises a plastic deck that forms a superstructure of the mower housing and a metallic liner that forms at least a cutting chamber of the mower housing, the metallic liner being rigidly affixed to the plastic deck in a manner to be received within and substantially hidden by the plastic deck. A handle assembly extends upwardly and rearwardly from the housing. A cutting blade is received within the cutting chamber formed in the metallic liner. A motive means is carried on the mower housing for rotating the blade in a plane of rotation about a generally vertical rotational axis.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
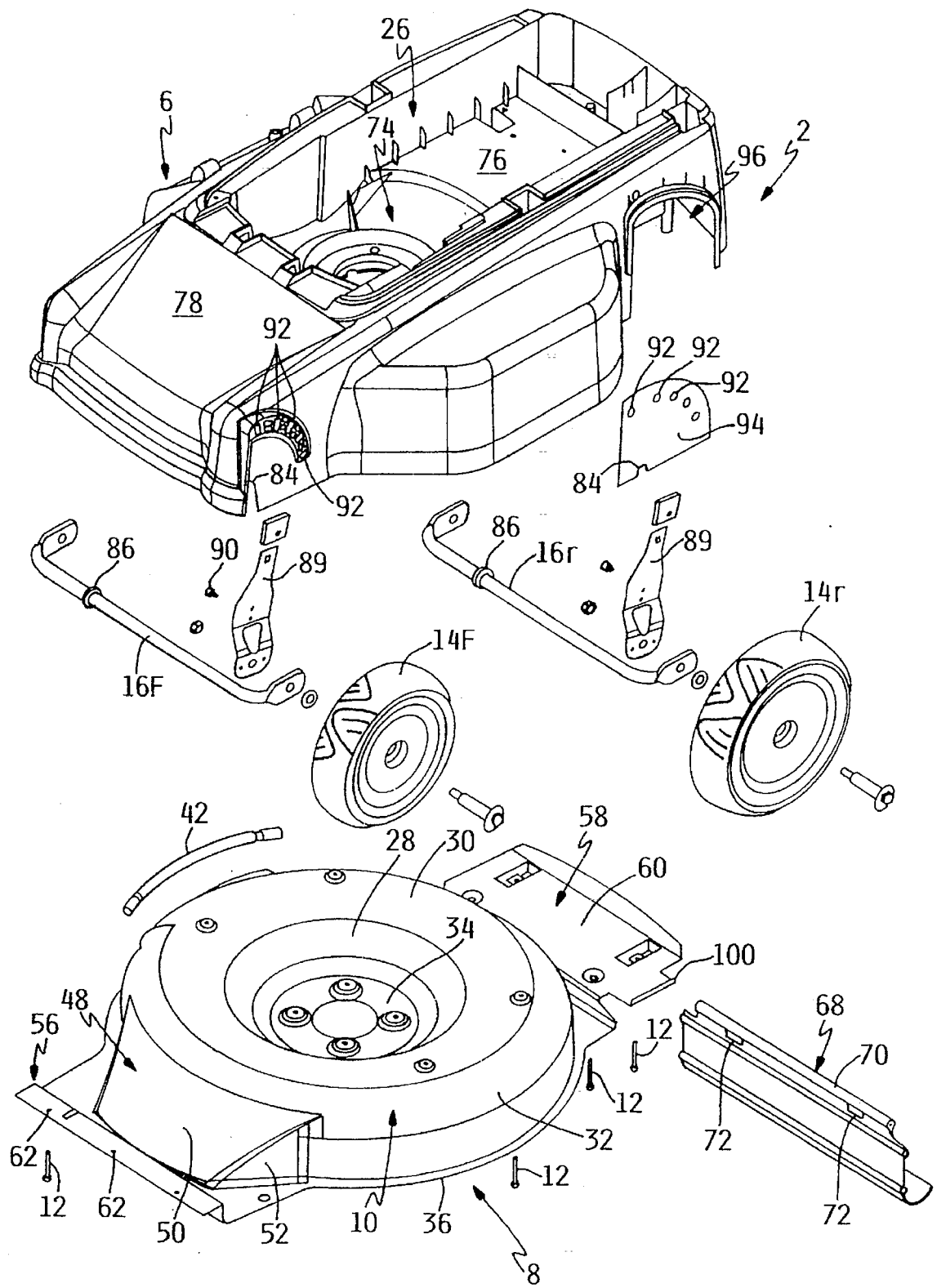
FIG. 1 is a perspective view of a lawn mower according to this invention, particularly illustrating the mower housing in an exploded form with the plastic deck being separated from the metallic liner.

Referring to FIG. 1, the mower 2 of this invention includes a mower housing 4 having a sandwich construction for providing a cost-effective yet strong and durable mower 2. This sandwich construction includes:

- a one-piece plastic deck 6, injection molded from an inexpensive, lightweight plastic material (e.g. high-density polyethylene), that forms the visible superstructure of mower 2; and
- a metallic liner 8, stamped from relatively thin steel (e.g. 20 gauge), that forms the cutting chamber 10 and is integrally affixed to plastic mower deck 6 to be received within and hidden by plastic mower deck 6.

Deck 6 and liner 8 will be integrally affixed to one another by a plurality of attachment screws 12. When so united to form mower housing 4, the combined weight of deck 6 and liner 8 is quite light, on the order of ten pounds or so.

Mower housing 4 is supported for movement over the ground by a plurality of rotatable, ground engaging wheels 14, disposed in a pair of front wheels 14f and a pair of rear wheels 14r. Only one front wheel 14f and one rear wheel 14r of each pair are shown in FIG. 1. The front wheels 14f are rotatably carried on the opposed ends of a front axle 16f. Similarly, the rear wheels 14r are rotatably carried on the opposed ends of a rear axle 16r. Front and rear axles 16 are supported on mower housing 4 simply by being captured or trapped between deck 6 and liner 8 when those two components are assembled together to form mower housing 4, as will be described in more detail hereafter.

A motive means 18 is carried on mower housing 4 arranged with its drive shaft 20 extending vertically for rotating a cutting blade 22 within cutting chamber 10 in mower housing 4. Cutting chamber 10 is configured to act as an extremely effective mulcher even with a relatively low power motive means 18. Preferably, motive means 18 comprises an electric motor 24, either a DC motor operated by self-contained batteries (not shown) carried in mower housing 4 or an AC motor operated by an external electrical AC power source (not shown) coupled to the motor by suitable electrical cords (not shown). However, mower 2 of this invention is not limited for use with electrical motors, but may also employ an internal combustion engine in place of electric motor 24.

Motor 24 is carried on mower housing 4 within a recessed motor compartment 26 provided in plastic deck 6. Deck 6 preferably includes a motor shroud (not shown) to enclose motor compartment 26 to protect motor 24 and its associated electrical components from exposure to the environment. In addition, mower 2 includes a U-shaped handle assembly (not shown) extending upwardly and rearwardly from mower housing 4 to allow mower 2 to be pushed and manipulated by an operator who walks behind mower housing 4. Thus, lawn mower 2 of this invention is of the type commonly known as a walk behind rotary mower.

Referring now to the construction of metallic liner 8, liner 8 includes a generally toroidal or "doughnut" shaped cutting chamber 10 in which the cut grass particles are circulated before they are discharged. This cutting chamber 10 is formed by various integrally formed walls including an inner circumferential wall 28, a relatively horizontal top wall 30, and an outer circumferential wall 32. Inner circumferential wall 28 slopes inwardly as it extends downwardly from top wall 30 to its lower end where it joins a ring-shaped motor attachment flange 34. Inner circumferential wall 28 and motor attachment flange 34 effectively form a pie-shaped recess in the central portion of liner 8. Outer circumferential wall 32 extends generally vertically downwardly from top wall 30 to terminate in a lower peripheral edge 36. Outer circumferential wall 32 is considerably longer than inner circumferential wall 28 such that its lower peripheral edge 36 is located below the plane of rotation of cutting blade 22.

The toroidal cutting chamber 10 formed in liner 8 is generally flat and of relatively constant cross-sectional shape except for two exceptions. First, a side discharge opening 38 is provided in outer circumferential wall 32 of chamber 10 along one lateral side to allow grass clippings to be discharged through that opening 38 to the side of mower 2. Plastic deck 6 preferably includes a pivotal flap or cover (not shown) that is spring biased to normally cover side discharge opening 38 to close this opening 38 off and to place mower 2 into its mulching mode. In this mulching mode, cutting chamber 10 is effectively closed over its sides and its top such that the grass clippings can be discharged only through the open bottom face of cutting chamber 10. However, if one wishes to discharge the grass to the side rather than to mulch, the flap or cover that normally covers side discharge opening 38 can be pivoted upwardly to open side discharge opening 38 in liner 8. Then, the grass clippings exit through the side 38 of liner 8 and through a side discharge chute to fall directly onto the ground or into a bagging attachment that may be connected to plastic deck 6 in communication with side discharge opening 38.

Figure 2:
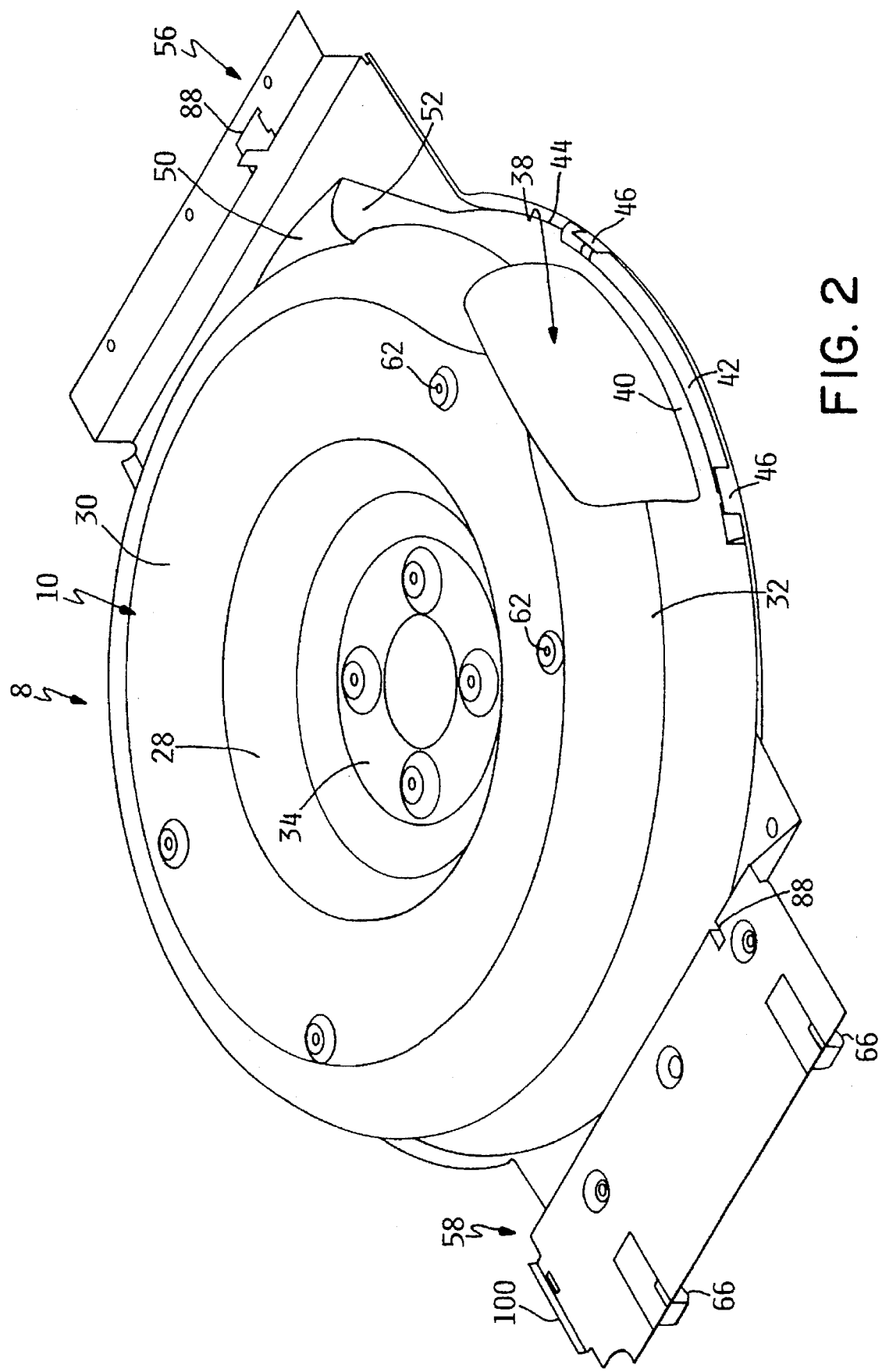
FIG. 2 is a perspective view of the metallic liner of the mower housing shown in FIG. 1, particularly illustrating the side discharge opening therein for allowing grass clippings to exit through one of the lateral sides of the cutting chamber and the reinforcement rod placed beneath the side discharge opening to reinforce the liner in that area.

Side discharge opening 38 extends over a substantial portion of the depth of outer circumferential wall 32. This leaves only a small strip 40 of steel remaining in that wall underlying side discharge opening 38. Because this area of liner 8 is often impacted with rocks or other debris being circulated in cutting chamber 10, a separate steel or plastic reinforcing rod 42 is attached to liner 8 in that strip area underlying side discharge opening 38 to provide adequate strength and durability. Rod 42 is configured to nest within a portion of an upturned lip 44 provided on lower peripheral edge 36 underlying side discharge opening 38. Lip 44 is provided with two tabs 46 that may be bent down to clinch rod 42 in place after rod 42 is nested within lip 44. The tabs are shown in FIG. 2 prior to being clinched downwardly over rod 42.

The second exception to the generally uniform shape of the toroidal cutting chamber is a forwardly extending, wedge-shaped extension 48 provided in liner 8 over a forward portion of cutting chamber 10. Basically, outer circumferential wall 32 of deck 6 is pulled forwardly over this area and is sloped downwardly as it extends forwardly to form a top wall 50 of extension 48. Triangularly shaped side walls 52 join the sloped top wall 50 of wedge-shaped extension 48 to the normal, curved shape of outer circumferential wall 32. Forward wedge-shaped extension 48 decreases in depth as it extends forwardly. In addition, side walls 52 of forward extension 48 slant inwardly as they extend forwardly such that forward extension 48 also decreases in width.

Figure 4:
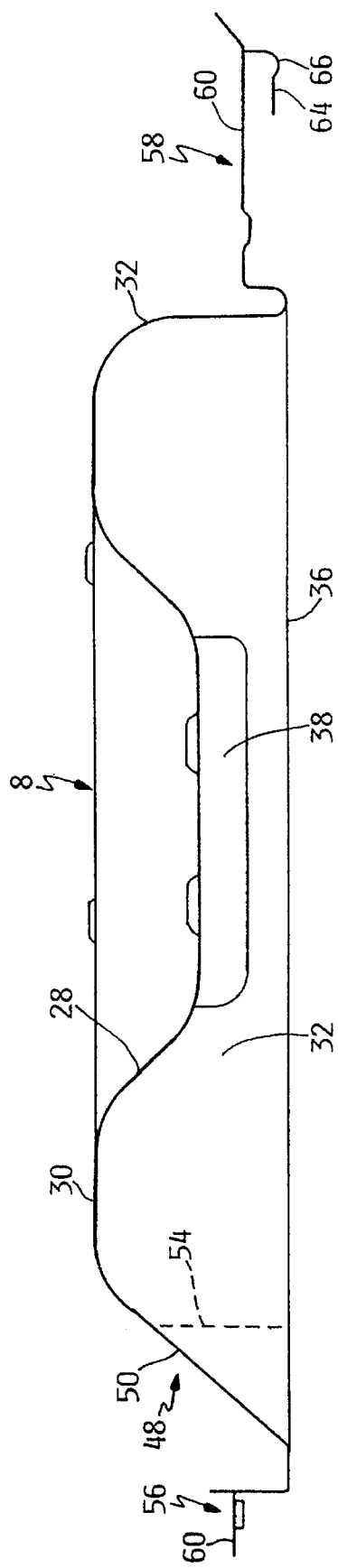
FIG. 4 is a longitudinal cross-sectional view of the metallic liner of the mower housing taken along lines 4—4 of FIG. 3.
Figure 5:
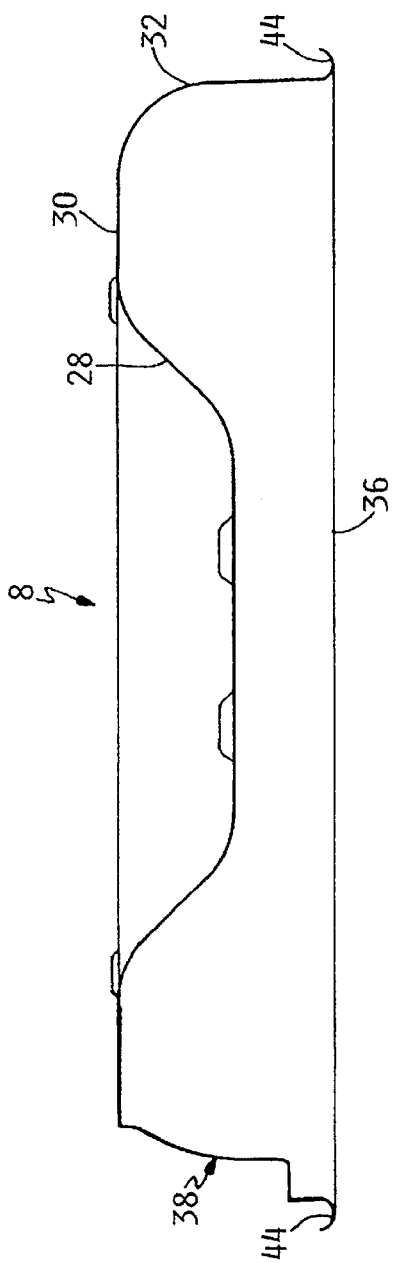
FIG. 5 is a transverse cross-sectional view of the metallic liner of the mower housing taken along lines 5—5 of FIG. 3.

The purpose of forward wedge-shaped extension 48 is to form a space in toroidal cutting chamber 10 of expanded volume to allow the grass clippings being circulated in cutting chamber 10 to more quickly leave cutting chamber 10 and be mulched. Referring to FIG. 4, the normal cross-sectional shape of the toroidal cutting chamber is indicated by the dashed line 54. Thus, wedge-shaped extension 48 comprises that space or volume forward of dashed line 54, keeping in mind that FIG. 4 is a two-dimensional representation of wedge-shaped extension 48 taken along the longitudinal centerline of mower 2. Wedge-shaped forward extension 48 has been found by the Applicants to be particularly desirable in improving the mulching efficiency of an electrically powered mower or any mower in which the power available for cutting is a concern.

Figure 3:
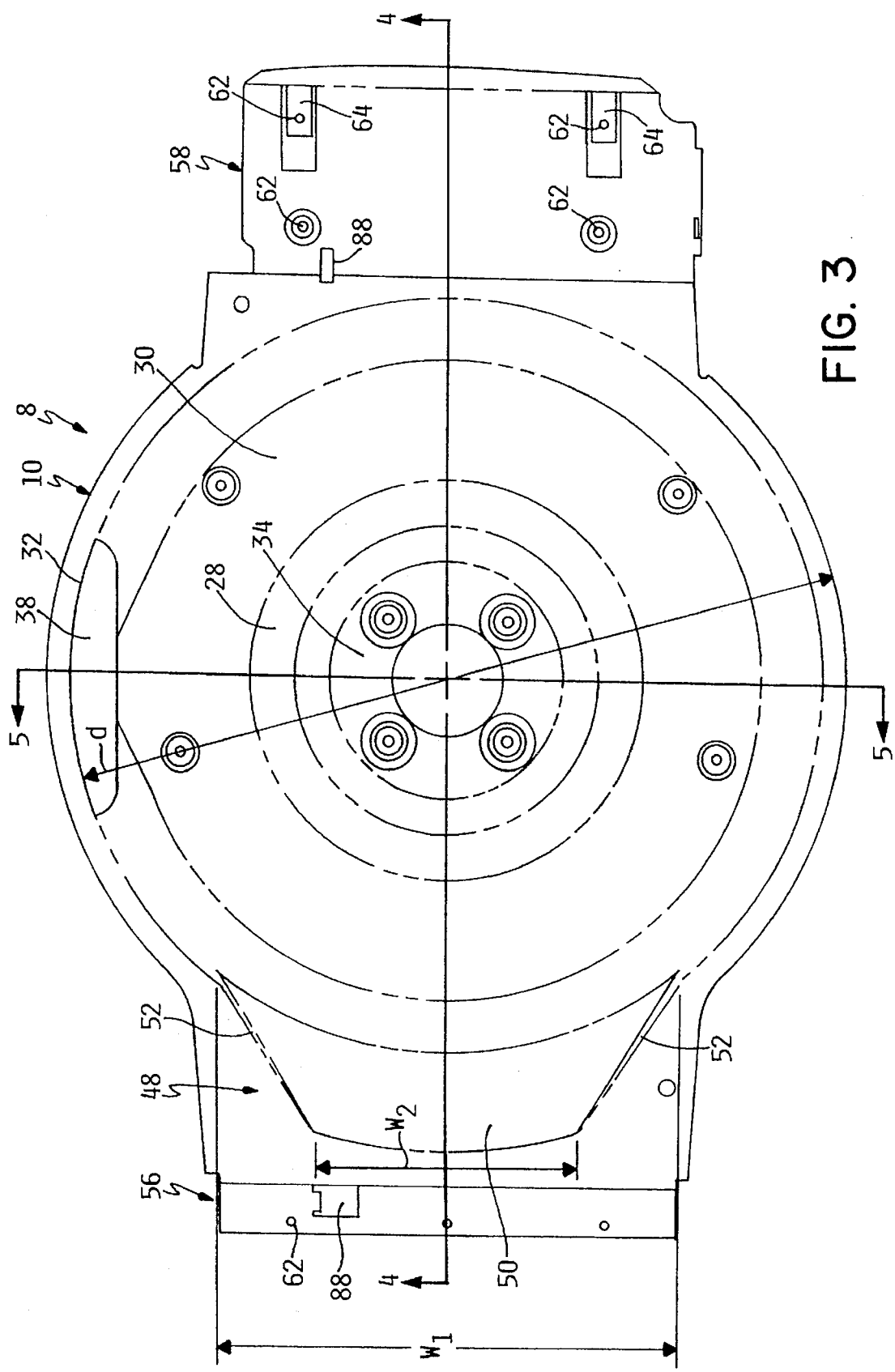
FIG. 3 is a top plan view of the metallic liner of the mower housing shown in FIG. 1.
Figure 6:
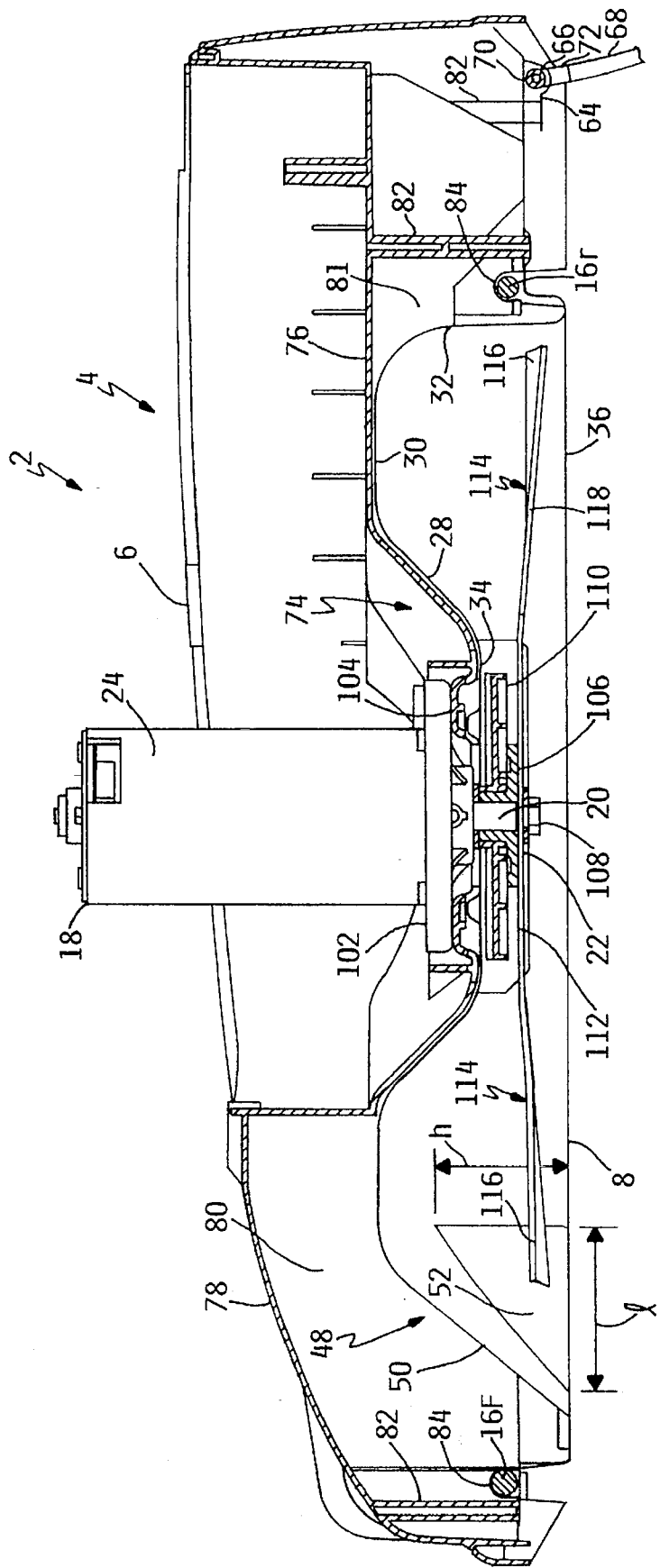
FIG. 6 is a longitudinal cross-sectional view of the mower housing shown in FIG. 1 taken along a longitudinal centerline of the mower housing, particularly illustrating the plastic deck and metallic liner in an assembled relationship and showing the cutting blade received within the cutting chamber formed in the metallic liner.

Referring to FIG. 3, in a mower 2 having a cutting chamber 10 with a diameter d of approximately 18 inches, one version of wedge-shaped extension 48 giving good results has a maximum width $w_1$ of approximately 11 inches tapering inwardly to a minimum width $w_2$ of approximately 7 inches. Referring to FIG. 6, in a mower 2 having a perpendicular distance h of approximately 3.5 inches between lower peripheral edge 36 and top wall 30, such an extension has a maximum height h at the rear of approximately 2.5 inches and a length l along the base of side wall 52 of approximately 3.75 inches. In general, the Applicants have found that maximizing the volume in extension 48 is desirable within the constraints of size imposed by the dimensions of the forward portion of mower 2.

In addition to cutting chamber 10 just described, liner 8 also includes front and rear attachment aprons 56 and 58 integrally formed therewith. Each of the attachment aprons 56, 58 includes a relatively horizontal surface 60 that is spaced a small distance above lower peripheral edge 36 of cutting chamber 10. Each attachment apron 56, 58 includes a plurality of holes 62 through which some of the threaded attachment screws 12 extend when joining liner 8 to plastic deck 6. Three such holes 62 are spaced across the width of front apron 56. Four such holes 62 are spaced across the width of rear apron 58, two holes 62 in a front row and two holes 62 in a rear row.

Each of the attachment holes 62 in the rear row on rear apron 58 are not formed in the plane of horizontal surface 60 of apron 58 as are holes 62 in the front row. Rather, the rear attachment holes 62 are carried on the front end of forwardly extending fingers 64 that are bent downwardly out of relieved portions of apron 58 such that fingers 64 are parallel to horizontal surface 60 of apron 58 but are located beneath the relieved apron portions. Each finger 64 includes an arcuate groove 66 located immediately rearwardly of each rear attachment hole 62.

This finger construction forms a convenient way of attaching a trailing rear shield 68 to mower 2. Shield 68 is molded of a plastic material having a cylindrical upper portion 70 forming a pivot rod. This cylindrical portion 70 can be received in arcuate grooves 66 on fingers 64 by pushing cylindrical portion 70 rearwardly in the gap formed between fingers 64 and rear apron 58 until cylindrical portion 70 drops into place in arcuate grooves 66. Trailing rear shield 68 is provided with slots 72 to allow fingers 64 to pass through the plane of shield 68 during this insertion process. In any event, when trailing rear shield 68 is so installed, shield 68 is free to rotate around the axis of its cylindrical portion 70, but will be retained on liner 8 by the same two attachment screws 12 passing upwardly through attachment holes 62 in fingers 64. Thus, mower 2 need not have any separate way of pivotally attaching trailing rear shield 68 to liner 8—some of the same attachment screws 12 that help hold liner 8 to plastic deck 6 retain trailing rear shield 68 in place in arcuate grooves 66 formed in fingers 64.

Turning now to the construction of plastic deck 6, plastic deck 6 is formed to substantially wholly enclose and surround steel liner 8 when the two are united together. Deck 6 includes a recessed motor compartment 26 that has a pie-shaped portion 74 that corresponds in shape to the pie-shaped central portion of liner 8. In addition, motor compartment 26 includes a flat floor 76 extending rearwardly from pie-shaped portion 74. This flat rear floor 76 of motor compartment 26 is used as a battery storage area in a mower powered by a DC motor. In any event, when liner 8 and deck 6 are joined together, pie-shaped portion 74 of motor compartment 26 nests within the similarly shaped pie-shaped portion of liner 8 and rear floor 76 of motor compartment 26 abuts against a portion of top wall 30 of liner 8, as shown in FIG. 6.

Plastic deck 6 includes a raised nose portion 78 defining the front exterior surface of mower 2. When deck 6 and liner 8 are assembled together, this nose portion 78 is spaced substantially above the front portion of cutting chamber 10. However, a plurality of longitudinally extending ribs 80 are formed on the undersurface of nose portion 78 extending downwardly. These ribs 80 have a lower edge shaped to conform to the shape of liner 8 so as to abut against various portions of liner 8. One such longitudinal rib 80 is shown in FIG. 6 abutting against a portion of top wall 30 of liner 8 and wedge-shaped extension 48 of cutting chamber 10. In addition, similar longitudinal ribs 81 can extend downwardly from rear floor 76 of plastic deck 6 to engage against the rear portion of cutting chamber 10 and rear apron 58 in selected portions thereof. Transverse ribs (not shown) can also extend downwardly from the underside of deck 6 to engage against lateral portions of cutting chamber 10.

The underside of plastic deck 6 is also formed with a plurality of downwardly extending bosses 82 each having an interior bore with screw 12 being self-threading when screwed into such bores. These various bosses 82 are aligned with attachment holes 62 in liner 8 when deck 6 is superimposed on liner 8. Thus, the various attachment screws 12 can extend upwardly through attachment holes 62 in liner 8 to be threaded into bosses 82 on deck 6 to firmly and rigidly secure deck 6 to liner 8. In addition to attachment holes 62 provided on the front and rear aprons of liner 8 as described previously, various other attachment holes 60 can be provided on top wall 30 of cutting chamber 10 to be mated with other bosses (not shown) on deck 6.

As previously described, wheels 14 used to support mower housing 4 are carried on the opposed ends of front and rear steel axles 16. Axles 16 are conveniently formed as separate components. Some of the ribs 80, 81 on the underside of deck 6, as well as the side walls of deck 6, are formed with arcuate bearing surfaces 84 in which axles 16 are received. Axles 16 are merely placed into such bearing surfaces 84 before liner 8 is joined to deck 6. When liner 8 is then screwed to deck 6, the front and rear aprons 56, 58 thereon hold axles 16 in place in deck 6, i.e. axles 16 are captured or trapped between arcuate bearing surfaces 84 in deck 6 and the front and rear aprons of liner 8. Thus, axles 16 are easily and inexpensively mounted on mower housing 4 due to the sandwich construction comprising deck 6 and liner 8.

Each axle 16 includes an integrally formed circular ring 86 thereon. At least some of arcuate bearing surfaces 84 formed in deck 6 are spaced apart by a distance slightly greater than the thickness of ring 86 to allow ring 86 to be received therein. In addition, the front and rear aprons on liner 8 are each provided with a slot 88 for receiving a bottom portion of ring 86 when deck 6 and liner 8 are assembled together. This ring 86 and its described engagement with deck 6 and liner 8 prevent substantial lateral movement of axle 16 relative to mower housing 4 to prevent wheels 14 from engaging against the sides of mower housing 4.

Each axle 16 is normally fixed in place on mower housing 4 through a height of cut adjustment mechanism which will be described next. However, axles 16 are free to rotate relative to mower housing 4 during a height of cut adjustment operation to vary the position of wheels 14 relative to the housing. Thus, while the deck and liner construction sandwiches or traps axles 16 therebetween, they are not trapped so tightly that they cannot rotate during a height of cut adjustment operation. However, once the height of cut is set to a desired value and that adjustment is locked in place, axles 16 are then non-rotatably fixed to mower housing 4 during normal operation of mower 2.

Conventional height of cut adjustment mechanisms are provided for changing the height of mower housing 4 relative to the ground. These include a height of cut lever 89 formed as a spring arm which is clamped or fixed to each axle 16 using the same pivot bolt that rotatably journals one of wheels 14 to axle 16. Each height of cut lever 89 carries a pin or button 90 which is received in one of a plurality of locking recesses 92 formed in an arcuate array. The spring bias in lever 89 is normally in the direction that keeps locking pin 90 engaged with one of locking recesses 92 in the array thereof. However, when it is desired to change the height of cut, the operator need only pull outwardly on lever 89 to disengage pin 90 from a first recess 92, to then rotate axle 16 using height of cut lever 89 until pin 90 thereon is aligned with a different recess 92, and to then release height of cut lever 89 to allow the bias therein to force pin 90 into the new recess 92, thus changing the orientation of wheels 14 relative to mower housing 4 to adjust the height of mower housing 4 relative to the ground.

Locking recesses 92 for the front height of cut lever 89 can simply be molded into one side wall of plastic deck 6 as only ⅓ of the weight carried on deck 6 is at the front of mower 2. However, a separate steel plate 94 is used for providing locking recesses 92 on the rear of mower 2, where the batteries are stored, to coact with the rear height of cut lever 89 since ⅔ of the mower's weight is at the rear of mower 2. This plate 94 can simply be inserted into a slot in a recess 96 formed therefor in the side wall of deck 6 with plate 94 again being clamped between deck 6 and liner 8 when the two are assembled together. In this regard, rear apron 58 of liner 8 has an upturned side lip 100 for engaging against the outside of the bottom of plate 94 when plate 94 is clamped in place by liner 8. Locking recesses 92 at the front and rear of mower 2 and their corresponding height of cut levers 89 are desirably provided on only one side of plastic deck 6.

The Applicants have found that mower housing 4 formed by an upper plastic deck 6 and a fixedly attached steel liner 8 is inexpensive to produce but very rigid and durable during operation. Steel liner 8 withstands impacts from rocks and other debris and is not prone to being chipped or damaged during use of mower 2. Plastic deck 6 can be inexpensively formed from a less expensive plastic and united to steel liner 8, providing a mower housing 4 which is less expensive than one which is cast from aluminum or one made from a plastic of sufficient durability that it could be used to form cutting chamber 10. The nested configuration of the pie-shaped portions of deck 6 and liner 8, the abutment of the various surfaces therebetween, the use of the front and rear attachment aprons on liner 8, all provide a liner 8 which can be easily attached to plastic deck 6 and which rigidifies plastic deck 6 to a substantial degree.

Another advantage of this sandwich construction is the ability to conveniently and simply support some of the other components of mower 2 between deck 6 and liner 8, or on liner 8, when deck 6 and liner 8 are joined together. For example, the front and rear axles 16 are simply trapped or captured between arcuate bearing surfaces 84 therefor as formed in deck 6 and portions of liner 8 and are retained in place simply by securing liner 8 to deck 6. Similarly, trailing rear shield 68 simply hangs from a portion of liner 8 and is retained in place by some of the same attachment screws 12 which join deck 6 and liner 8 together. This contributes to the cost effectiveness of mower housing 4.

In addition, it is possible to easily change the styling or look of mower 2, or to have different looks for different models of mowers, simply by having differently shaped plastic decks 6 that can be joined to a common liner 8. Again, this contributes to manufacturing efficiency and to the cost effectiveness of mower 2.

As noted previously and as shown in FIG. 6, mower 2 is preferably equipped with a DC motor. One such motor that can be used is a 24 V DC motor having approximately 0.68 peak horsepower, though a 36 V DC motor could also be used. Motor 24 is received in the central portion of mower housing 4 and specifically in the nested pie-shaped portions of plastic deck 6 and liner 8. Motor 24 includes a flat attachment bracket 102 on the bottom thereof which rests on a ring 104 carried at the bottom of pie-shaped portion 74 on plastic deck 6. A plurality of bolts extend up through motor attachment flange 34 on liner 8 and through ring 104 on deck 6 to bolt electric motor 24 in place.

Electric motor 24 includes a vertically downwardly extending drive shaft 20. The lower end of drive shaft 20 includes an internally threaded bore. A bushing 106 is received around drive shaft 20 and a bolt 108 is used to clamp cutting blade 22 against the bottom of bushing 106, bolt 108 being threaded into and tightened in the bore on the lower end of drive shaft 20. A fan 110 is not-rotatably received on bushing 106, e.g. by a polygonal fit between the two, to rotate with bushing 106 and hence with blade 22. Fan 110 helps cool electric motor 24.

Cutting blade 22 received in cutting chamber 10 includes a relatively flat central portion 112 and downwardly sloped radial outer portions 114. Each radial outer portion includes an upturned sail 116 at its radially outer end along the trailing edge of blade 22, tipped up at 15° relative to the horizontal. A sharpened cutting edge 118 is located in the downwardly sloped outer blade portions 114 along the leading blade edge which cutting edge 118 has a length generally equal to or slightly less than the normal cross-sectional width of toroidal cutting chamber 10. As blade 22 is rotated by operation of motor 24 in a generally horizontal cutting plane, cutting edges 118 sever grass and circulate the cut grass clippings in cutting chamber 10 in the direction of rotation of the blade. Basically, the grass clippings form a rotating mass or halo of clippings carried in cutting chamber 10.

The Applicants have found that use of the forwardly extending wedge-shaped extension 48 of cutting chamber 10 significantly reduces the power consumption of an electrically powered mower. This is thought to be due to the relative quickness in which the clippings exit cutting chamber 10. Rather than continually circulating the clippings in a large mass around and around cutting chamber 10 until they fall out of the open bottom face of cutting chamber 10, the clippings more quickly fall out of cutting chamber 10 when they reach wedge-shaped extension 48 and the expanded volume contained therein. This is assisted by the downward slope of top wall 50 of extension 48 which mechanically deflects the clippings downwardly out of cutting chamber 10 and into the grass. While some of the clippings may be picked up and recut again when mower 2 passes over them since they are deposited in advance of cutting blade 22, at least some will be hidden in the grass after their first pass through wedge-shaped extension 48. Thus, the blade does not have to circulate as large a mass of clippings as it would if wedge-shaped extension 48 were absent and the front of cutting chamber 10 had the same cross-sectional toroidal shape as the rest of cutting chamber 10.

The practical effect of this wedge-shaped extension 48 of cutting chamber 10 is that the amperage draw on electric motor 24 is considerably less than in a mower without this extension. In a battery powered mower having a DC motor 24, this translates into a longer run time for mower 2 given the same battery charge. This is a significant advantage.

The Applicants have tested a mower 2 of this invention having forward wedge-shaped extension 48 powered by a 24 V DC motor against a competitive electrically powered mower utilizing a similar 24 V DC motor and battery power. In a test of free run time, i.e. how long a full charge will be depleted by operation of the motor while running freely without cutting grass, the mower 2 of this invention had an average free run time of 114 minutes versus an average free run time of 100 minutes for the competitive mower. However, in a test of run time while cutting 1 inch of grass and mulching the clippings, the run time of mower 2 decreased to an average of 79 minutes while the run time of the competitive mower decreased to an average of 47 minutes. Thus, the run time of mower 2 decreased only approximately 30% from its free run time while mulching while the run time of the competitive mower 2 decreased approximately 53% while mulching in similar conditions. Mower 2 can simply run longer while mulching than a similar competitive mower due to the use of wedge-shaped extension 48.

Wedge-shaped extension 48 is shown as being located at the front of cutting chamber 10 and extending forwardly therefrom. This allows the grass clippings to be mulched down into the grass in advance of cutting blade 22. Longer clippings which are not hidden well in the grass will be picked up again when the blade passes over them and recut, further enhancing the mulching effectiveness of mower 2.

However, much of the decrease in power consumption exhibited by use of wedge-shaped extension 48 is thought to be due simply to its ability to more quickly allow the clippings to exit from the otherwise generally closed cutting chamber 10. In this regard, placement of wedge-shaped extension 48 towards the front of cutting chamber 10 is not critical. It could as well extend rearwardly from the rear of cutting chamber 10.

Various other modifications of this invention will be apparent to those skilled in the art. For example, if an AC motor is placed within motor compartment 26, the actual motor 26 can be placed over floor 76 and a belt transmission can be used to drive a blade spindle mounted in the pie-shaped portion 74 of deck 6. In addition, while use of an electric motor 24 in conjunction with wedge-shaped extension 48 of cutting chamber 10 is particularly effective, a cutting chamber with such an extension will also increase the mulching effectiveness of a mower powered by a gasoline engine, particularly by such engines having lower power. Accordingly, the scope of this invention is to be limited only the appended claims.

I claim:

1. A rotary lawn mower, which comprises:
   (a) a housing supported for movement over the ground by a plurality of wheels, the housing comprising:
      (i) a plastic deck that forms a superstructure of the mower housing, wherein the deck is made of an olefin polymer of a type and grade that can be molded; and
      (ii) a metallic liner that forms at least a cutting chamber of the mower housing, the metallic liner being rigidly affixed to the plastic deck in a manner to be received within and substantially hidden by the plastic deck, wherein the metallic liner is made of steel of approximately 20 gauge;
   (b) a handle assembly extending upwardly and rearwardly from the housing;
   (c) a cutting blade received within the cutting chamber formed in the metallic liner; and
   (d) a motive means carried on the mower housing for rotating the blade in a plane of rotation about a generally vertical rotational axis.

2. A lawn mower as recited in claim 1, wherein the olefin polymer comprises high density polyethylene.

3. A lawn mower as recited in claim 1, wherein the plastic deck and metallic liner each include pie-shaped central portions surrounding the rotational axis of the blade, the pie-shaped central portions being nested together when the liner and the deck are affixed together.

4. A lawn mower as recited in claim 3, wherein the metallic liner includes front and rear apron portions extending outwardly from front and rear sides of the cutting chamber, the liner being connected to the plastic deck at the front and rear aprons and at the cutting chamber.

5. A lawn mower as recited in claim 1, wherein the metallic liner includes front and rear apron portions extending outwardly from front and rear sides of the cutting chamber, the liner being connected to the plastic deck at the front and rear aprons and at the cutting chamber.

6. A lawn mower as recited in claim 5, further including front and rear axles on which the wheels are carried, the axles being trapped and retained between the deck and the liner when the deck and the liner are secured together.

7. A lawn mower as recited in claim 6, wherein the deck includes downwardly facing, arcuate bearing surfaces aligned in two rows thereof, and wherein the front axle is received in one row and the rear axle in the other row of such bearing surfaces, and wherein the front and rear axles are retained in their respective rows of bearing surfaces by the front and rear aprons of the liner, respectively, which are positioned substantially immediately beneath the rows of bearing surfaces when the deck and the liner are secured together.

8. A lawn mower as recited in claim 1, wherein an underside of the plastic deck includes a plurality of downwardly extending longitudinal ribs, and wherein the ribs are configured to abut against various portions of the liner when the liner and the deck are rigidly affixed to one another.

9. A lawn mower as recited in claim 1, wherein the liner and the deck may be secured to one another by attachment screws.

10. A lawn mower as recited in claim 1, further including a height of cut adjustment mechanism including a rotatable lever attached to at least one axle that supports at least some of the wheels, the lever being cooperable with a locking means for holding the height of cut adjustment mechanism in an adjusted position, and wherein the locking means is provided in a member that is separate from the deck and the liner and which is trapped between the deck and the liner to be held therebetween when the deck and the liner are assembled together.

11. A lawn mower as recited in claim 1, wherein a plurality of fasteners rigidly affix the deck and the liner together, and further including a trailing rear shield which is retained on the housing formed by the deck and the liner by at least some of the fasteners used to affix the deck and the liner together.

12. A rotary lawn mower, which comprises:
   (a) a housing supported for movement over the ground by a plurality of wheels, the housing comprising:
      (i) a deck; and
      (ii) a liner that is separate from the deck and forms at least a cutting chamber of the mower housing, the liner being affixed to the deck such that the deck overlies the liner;
   (b) a plurality of axles on which the wheels are carried;
   (c) coacting means formed on the deck and the liner for trapping the axles between the deck and the liner when the deck and the liner are secured together to thereby retain the axles on the housing;
   (d) a handle assembly extending upwardly and rearwardly from the housing;
   (e) a cutting blade received within the cutting chamber formed in the liner; and
   (f) a motive means carried on the mower housing for rotating the blade in a plane of rotation about a generally vertical rotational axis.

13. A lawn mower as recited in claim 12, wherein the axle trapping means further includes means for transversely aligning the axles to the deck and the liner.

14. A lawn mower as recited in claim 12, wherein a single front axle is provided for two front wheels, and a single rear axle is provided for two rear wheels.

15. A lawn mower as recited in claim 12, wherein the deck is formed of plastic and the liner from metal.

16. A rotary lawn mower, which comprises:
   (a) a housing supported for movement over the ground by a plurality of wheels, the housing comprising:

(i) a deck; and (ii) a liner that is separate from the deck and forms at least a cutting chamber of the mower housing, the liner being affixed to the deck such that the deck substantially overlies the liner;

(b) a plurality of axles on which the wheels are carried;

(c) a handle assembly extending upwardly and rearwardly from the housing;

(d) a cutting blade received within the cutting chamber formed in the liner;

(e) a motive means carried on the mower housing for rotating the blade in a plane of rotation about a generally vertical rotational axis, and (f) height of cut adjustment mechanisms connected to the axles for rotating the axles relative to the housing to vary the height of the housing relative to the ground, each height of cut adjustment mechanism including a rotatable lever attached to each axle with the lever being cooperable with a locking means for holding the height of cut adjustment mechanism in an adjusted position, and wherein the locking means for at least one lever is provided in a locking member that is separate from the deck and the liner and which is trapped between the deck and the liner to be held therebetween when the deck and the liner are assembled together.

17. A lawn mower as recited in claim 16, wherein the locking means for at least one other lever is integrally formed in the deck.

18. A lawn mower as recited in claim 16, wherein the deck is formed of plastic and the liner from metal.

19. A lawn mower as recited in claim 16, wherein the locking member comprises a plate having a plurality of locking recesses.

* * * * *